(12) United States Patent
Chiproot

(10) Patent No.: US 10,557,588 B2
(45) Date of Patent: Feb. 11, 2020

(54) PIPE REPAIR FITTING WITH END SEALS

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Tel Aviv (IL)

( * ) Notice: Subject to any disclaimer, the term of this patent is extended or adjusted under 35 U.S.C. 154(b) by 248 days.

(21) Appl. No.: 15/129,057

(22) PCT Filed: Mar. 25, 2015

(86) PCT No.: PCT/IB2015/052208
§ 371 (c)(1),
(2) Date: Sep. 26, 2016

(87) PCT Pub. No.: WO2015/145377
PCT Pub. Date: Oct. 1, 2015

(65) Prior Publication Data
US 2018/0172196 A1  Jun. 21, 2018

Related U.S. Application Data

(60) Provisional application No. 61/970,918, filed on Mar. 27, 2014.

(51) Int. Cl.
*F16L 55/172* (2006.01)
*F16L 23/16* (2006.01)
*F16L 21/06* (2006.01)

(52) U.S. Cl.
CPC ......... *F16L 55/1725* (2013.01); *F16L 21/065* (2013.01); *F16L 23/167* (2013.01); *F16L 55/172* (2013.01)

(58) Field of Classification Search
CPC ..... F16L 35/00; F16L 55/172; F16L 55/1725; F16L 21/065; F16L 25/14; F16L 23/167
(Continued)

(56) References Cited

U.S. PATENT DOCUMENTS 3,078,108 A   2/1963   Smith
3,954,288 A * 5/1976   Smith ............... F16L 55/175
                                                285/373 X
(Continued)

FOREIGN PATENT DOCUMENTS

EP   2679872   1/2014
ES   1057352   7/2004

OTHER PUBLICATIONS

PCT Written Opinion PCT/IB2015/052208, dated Jun. 24, 2015.

*Primary Examiner* — Zachary T Dragicevich
(74) *Attorney, Agent, or Firm* — Dekel Patent Ltd.; David Klein

(57) ABSTRACT

A pipe repair fitting (10) includes a pair of opposed generally semi-cylindrical sleeve members (12, 14) including side flanges (16, 18) and first fasteners (20) that engage the side flanges (16, 18) for fastening and encircling the sleeve members (12, 14) together onto a pipe to be repaired. Each sleeve member includes a central longitudinal semi-cylindrical portion (22). A first seal member (26) is disposed in at least one of the longitudinal semi-cylindrical portions (22) for sealing the sleeve members (12, 14) with respect to each other. Semi-annular clamp housings (24, 25) extend from opposite ends of the longitudinal semi-cylindrical portion (22). Ends of the semi-annular clamp housings (24, 25) include opposing clamp members (27). One or more second fasteners (30) tighten the clamp members (27) towards each other so as to apply a clamping force on the pipe to be repaired. At least one end seal (28) is disposed in the semi-annular clamp housings (24, 25).

5 Claims, 3 Drawing Sheets

(58) Field of Classification Search
USPC .................................... 285/15, 45, 373, 419
See application file for complete search history.

(56) References Cited

U.S. PATENT DOCUMENTS

| | | | |
|---|---|---|---|
| 5,288,108 A | | 2/1994 | Eskew |
| 6,131,957 A * | | 10/2000 | Saito .......................... 285/373 X |
| 6,305,719 B1 * | | 10/2001 | Smith, Jr. ............. F16L 55/175 |
| | | | 285/15 |
| 2007/0296213 A1 * | | 12/2007 | Jones .................... F16L 55/172 |
| | | | 285/373 X |

* cited by examiner

PIPE REPAIR FITTING WITH END SEALS

CROSS-REFERENCE TO RELATED APPLICATIONS

This application is a national phase application of PCT patent application PCT/IB2015/052208, filed 25 Mar. 2015, which claims priority under 35 USC § 119 to U.S. Provisional Patent Application, Ser. No. 61/970,918, filed 27 Mar. 2014, which are incorporated herein by reference.

FIELD OF THE INVENTION

The present invention relates generally to pipeline or pipe repair fittings, particularly of the diametrally split sleeve or ring type, and particularly to pipe repair fittings with end seals that accommodate a range of pipe diameters.

BACKGROUND OF THE INVENTION

Repair of a large pipe or pipeline, which may be necessary due to corrosion, thermal and/or mechanical stress which results in a leak, can be made by assembling a split sleeve or ring around the leaking area and then sealing the encircled zone. Conventional split repair fittings, particularly for large diameter pipelines, have often been fabricated from steel plate bent into an arcuate shape configured to fit concentrically over the pipe. Flanges or sidebars, typically cut from heavy steel plate stock, are welded along the axially extending edges of the arcuately bent plates so that the sidebars lie in generally radial directions and complete the arc of a segment comprising one-half of a split fitting. Ultimately, the sidebars of two opposed sleeve or ring segments are bolted together to encircle the pipe being repaired.

A problem of prior art pipe repair fittings is that they are manufactured to fit only one particular pipe diameter.

SUMMARY OF THE INVENTION

The present invention seeks to provide an improved pipe repair fitting, which solves the abovementioned problem of the prior art, as is described more in detail hereinbelow. Unlike the prior art, the pipe repair fitting of the present invention has end seals that accommodate a range of pipe diameters.

There is thus provided in accordance with an embodiment of the present invention a pipe repair fitting including a pair of opposed generally semi-cylindrical sleeve members including side flanges and first fasteners that engage the side flanges for fastening and encircling the sleeve members together onto a pipe to be repaired, each of the sleeve members including a central longitudinal semi-cylindrical portion, a first seal member disposed in at least one of the longitudinal semi-cylindrical portions for sealing the sleeve members with respect to each other when fastened on the pipe to be repaired, and semi-annular clamp housings extending from opposite ends of the longitudinal semi-cylindrical portion, wherein ends of the semi-annular clamp housings include opposing clamp members and one or more second fasteners for tightening the clamp members towards each other so as to apply a clamping force on the pipe to be repaired, and at least one end seal disposed in the semi-annular clamp housings.

In accordance with an embodiment of the present invention the end seal includes a one-layer seal or a multi-layer seal. The multi-layer seal may include concentric inner and outer sealing rings, wherein in a first operative configuration, both of the inner and outer sealing rings are present and in a second operative configuration, the inner sealing ring is removed so that only the outer sealing ring is present for sealing against the pipe to be repaired. The outer sealing ring may include an annular seal with an outer portion folded over an inner portion so as to define at least one inner annular space between and bounded by the inner and outer portions.

In accordance with an embodiment of the present invention the semi-annular clamp housings include a plurality of grip elements spaced from one another to form a semi-ring. A plurality of individual flexible elements may be affixed to side portions of adjacent grip elements.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Reference is now made to FIGS. 1-4, which illustrate a pipe repair fitting 10, constructed and operative in accordance with a non-limiting embodiment of the present invention.

Figure 5:
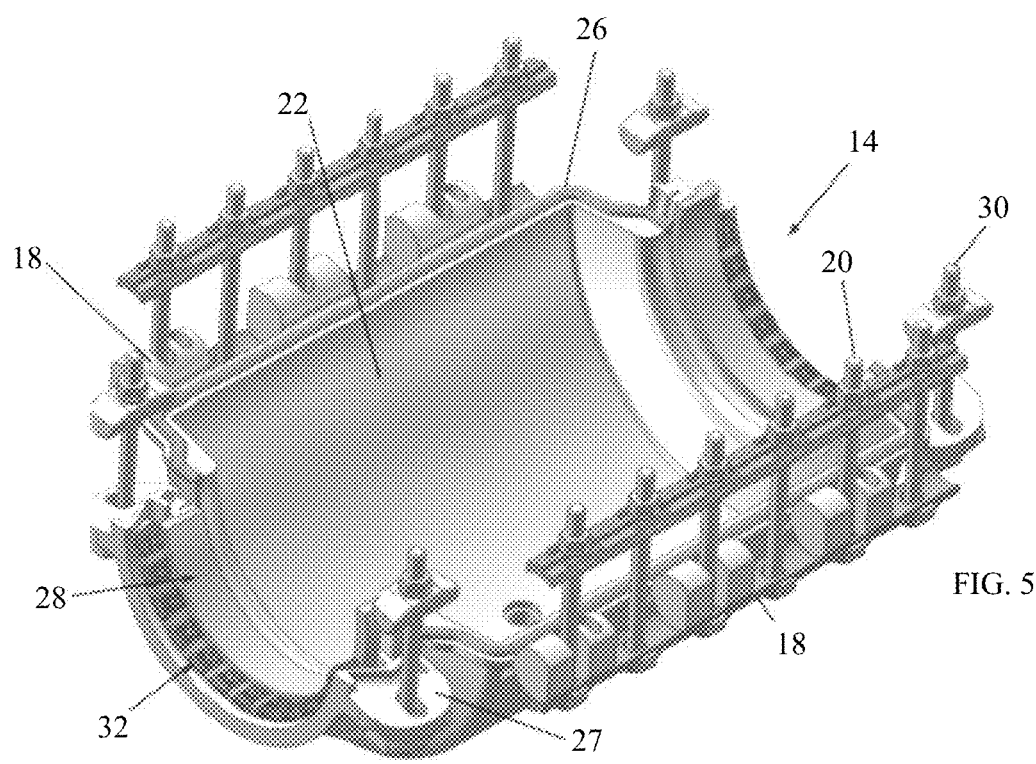

Pipe repair fitting 10 includes a pair of opposed generally semi-cylindrical sleeve members 12 and 14 that have side flanges 16 and 18, respectively. First fasteners 20 engage side flanges 16 and 18 for fastening and encircling sleeve members 12 and 14 together onto a pipe to be repaired (not shown). Each sleeve member 12/14 includes a central longitudinal semi-cylindrical portion 22. A first seal member 26 (seen in FIG. 5) is disposed in one or both of semi-cylindrical portions 22 for sealing the sleeve members 12 and 14 with respect to each other when fastened on the pipe to be repaired.

In one embodiment, the sleeve members 12 and 14 are separate from each other with first fasteners 20 on both sides of the sleeve members. In another embodiment, the sleeve members 12 and 14 are hinged with respect to each other on one long side thereof, and first fasteners 20 are on just one side of the sleeve members opposite the hinge side.

In contrast to prior art pipe repair fittings, pipe repair fitting 10 includes a pair of semi-annular clamp housings 24 and 25 extending from opposite ends of the semi-cylindrical portions 22 of sleeve members 12 and 14, respectively. Semi-annular clamp housings 24 and 25 are adapted for sealing against pipes of different diameters. The ends of both semi-annular clamp housings are provided with two opposing clamp members 27. One or more second fasteners 30 (e.g., one or more mechanical fasteners, such as a bolt or screw and a tightening nut, and possibly washer) fasten and tighten clamp members 27 towards each other so as to apply a clamping force on the pipe being clamped.

Figure 1:
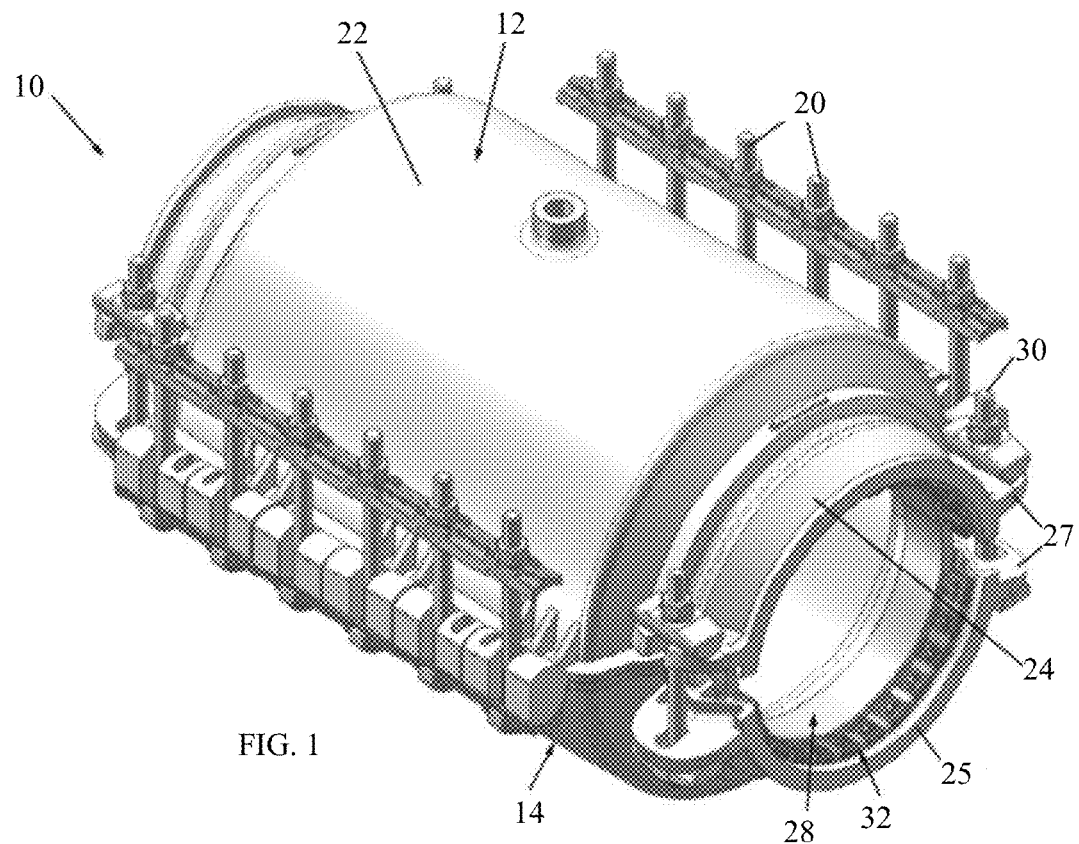
FIG. 1 is a simplified perspective illustration of a pipe repair fitting, constructed and operative in accordance with a non-limiting embodiment of the present invention.
Figure 2:
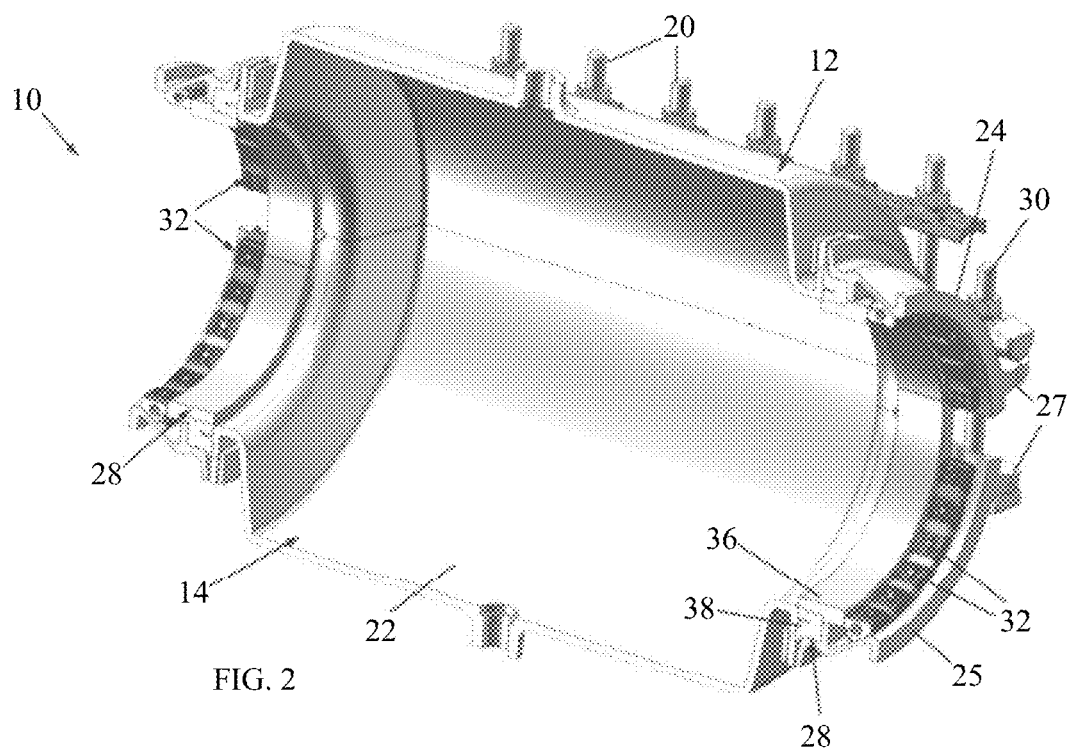
FIG. 2 is a simplified cutaway illustration of the pipe repair fitting, cut along its longitudinal length.
Figure 3:
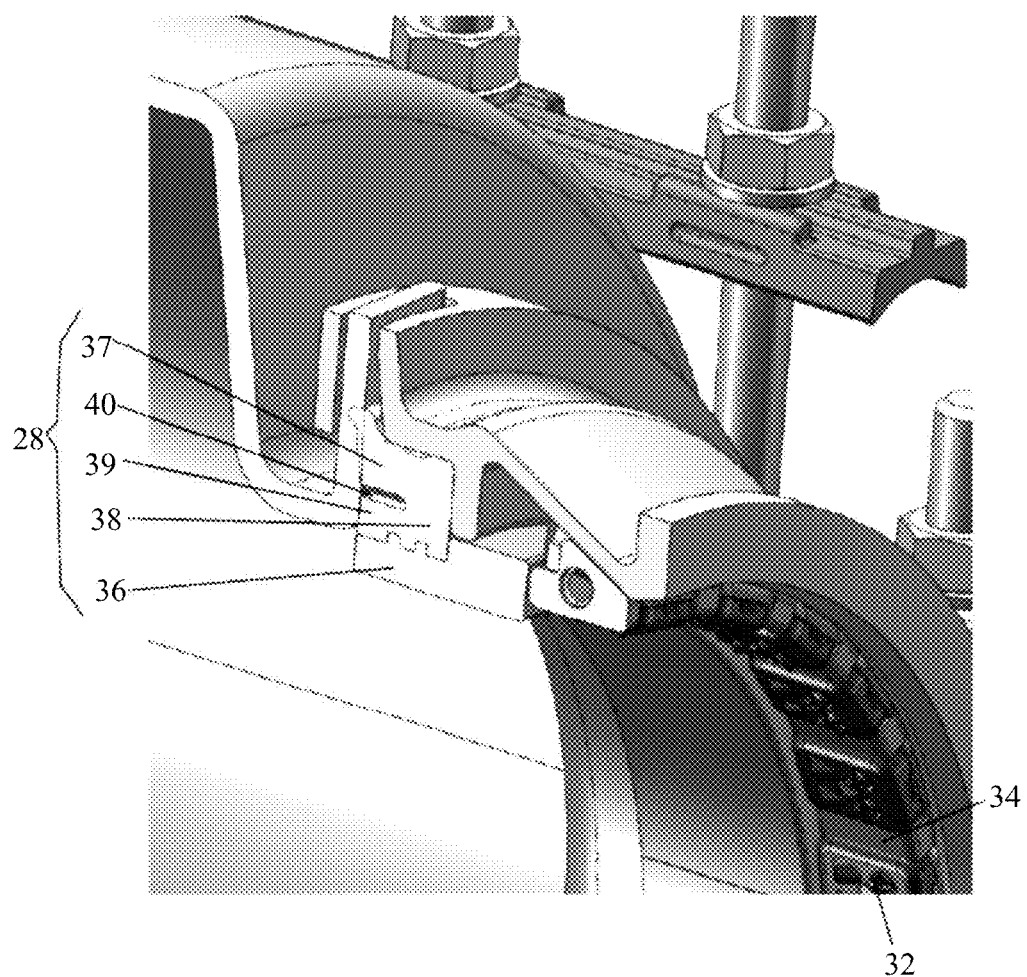
FIG. 3 is an enlarged illustration of one of the end seals of the pipe repair fitting.
Figure 4:
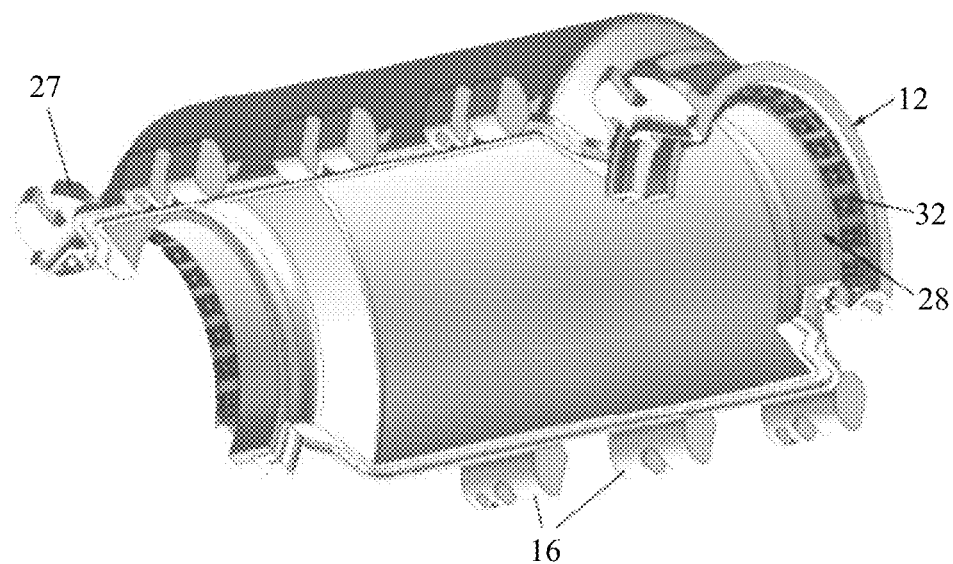
FIGS. 4 and 5 are simplified perspective illustrations of (upper and lower) semi-cylindrical sleeve members of the pipe repair fitting, in accordance with an embodiment of the present invention.

One or more end seals 28 are disposed in semi-annular clamp housings 24 and 25. In one embodiment, end seal 28 is a one-layer elastomeric seal. Additionally or alternatively, as seen in FIG. 3, the end seals 28 are multi-layer, e.g., having concentric inner and outer sealing rings 36 and 38, respectively. In a first operative configuration, both inner and outer sealing rings 36 and 38 are present and the inner sealing ring 36 clamps against a pipe of a first diameter. In a second operative configuration, the inner sealing ring 36 is removed so that only the outer sealing ring 38 is present for sealing against the pipe to be repaired. Thus, the outer sealing ring 38 is used for sealing against a pipe of a larger diameter than the inner sealing ring 36. Outer sealing ring 38 may include an annular seal with an outer portion 37 folded over an inner portion 39 so as to define at least one inner annular space 40 between and bounded by the inner and outer portions 37 and 39.

Even if a one-layer end seal is used, the tightening action of second fasteners 30 on semi-annular clamp housings 24 and 25 still provides effective sealing over a range of pipe diameters. This is in contrast to prior art repair sleeves which may have an O-ring at ends thereof but do not have semi-annular clamp housings at ends thereof and cannot provide tightening at the ends against the O-ring and can only tighten the row of first fasteners, which is sufficient for sealing against only one diameter.

In one non-limiting embodiment of the present invention, the semi-annular clamp housings 24 and 25 further include a plurality of grip elements 32 spaced from one another to form a semi-ring. A plurality of individual flexible elements 34 are affixed to side portions of adjacent grip elements 32. The grip elements 32 may be wedge-shaped with prongs or other protrusions to dig into the pipe for better holding power. The grip elements 32 provide gripping against a wide range of pipe diameters. Accordingly, the pipe repair fitting 10 can be provided with any combination of end seal (one-layer or multi-layer) with or without the grip semi-rings comprising the grip elements 32.

Any of the seals in the invention, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, the seals may be made of EPDM rubber with 70-80 Shore A durometer.

What is claimed is:

1. A pipe repair fitting comprising:
    a pair of opposed generally semi-cylindrical sleeve members comprising side flanges and first fasteners that engage said side flanges for fastening and encircling said sleeve members together onto a pipe to be repaired, each of said sleeve members comprising a central longitudinal semi-cylindrical portion;
    a first seal member disposed in at least one of said longitudinal semi-cylindrical portions for sealing said sleeve members with respect to each other when fastened on the pipe to be repaired, said first seal member being radially thinner than a radial thickness of said at least one of said longitudinal semi-cylindrical portions; and
    semi-annular clamp housings extending from opposite ends of said longitudinal semi-cylindrical portion, wherein ends of said semi-annular clamp housings comprise opposing clamp members and one or more second fasteners for tightening said clamp members towards each other so as to apply a clamping force on the pipe to be repaired, and at least one end seal disposed in each of said semi-annular clamp housings, and wherein said semi-annular clamp housings have a smaller diameter than said semi-cylindrical sleeve members and said first seal member comprises a portion that extends radially inwards to each of said semi-annular clamp housings adjacent each said at least one end seal, said portion of said first seal member extending longitudinally outwards of all of said first fasteners but longitudinally inwards of said one or more second fasteners;
    wherein said at least one end seal comprises a multi-layer seal; and
    wherein said multi-layer seal comprises concentric inner and outer sealing rings, wherein in a first operative configuration, both of the inner and outer sealing rings are present and in a second operative configuration, the inner sealing ring is removed so that only the outer sealing ring is present for sealing against the pipe to be repaired.

2. The pipe repair fitting according to claim 1, wherein said at least one end seal comprises a one-layer seal.

3. The pipe repair fitting according to claim 1, wherein said outer sealing ring comprises an annular seal with an outer portion folded over an inner portion so as to define at least one inner annular space between and bounded by the inner and outer portions.

4. A pipe repair fitting comprising:
    a pair of opposed generally semi-cylindrical sleeve members comprising side flanges and first fasteners that engage said side flanges for fastening and encircling said sleeve members together onto a pipe to be repaired, each of said sleeve members comprising a central longitudinal semi-cylindrical portion;
    a first seal member disposed in at least one of said longitudinal semi-cylindrical portions for sealing said sleeve members with respect to each other when fastened on the pipe to be repaired, said first seal member being radially thinner than a radial thickness of said at least one of said longitudinal semi-cylindrical portions; and
    semi-annular clamp housings extending from opposite ends of said longitudinal semi-cylindrical portion, wherein ends of said semi-annular clamp housings comprise opposing clamp members and one or more second fasteners for tightening said clamp members towards each other so as to apply a clamping force on the pipe to be repaired, and at least one end seal disposed in each of said semi-annular clamp housings, and wherein said semi-annular clamp housings have a smaller diameter than said semi-cylindrical sleeve members and said first seal member comprises a portion that extends radially inwards to each of said semi-annular clamp housings adjacent each said at least one end seal, said portion of said first seal member extending longitudinally outwards of all of said first fasteners but longitudinally inwards of said one or more second fasteners, wherein said semi-annular clamp housings comprise a plurality of grip elements spaced from one another to form a semi-ring.

5. The pipe repair fitting according to claim 4, wherein a plurality of individual flexible elements are affixed to side portions of adjacent grip elements.

* * * * *